United States Patent [19]

Fryer et al.

[11] Patent Number: 4,972,705
[45] Date of Patent: Nov. 27, 1990

[54] LIQUID LEVEL DETECTION

[75] Inventors: Clayton D. Fryer, Missouri City, Tex.; Kenneth E. Stie, Bartleville, Okla.; Michael W. Wedel, Bartlesville, Okla.; Kenneth R. Stamper, Bartlesville, Okla.

[73] Assignee: Phillips Petroleum Company, Bartlesville, Okla.

[21] Appl. No.: 419,348

[22] Filed: Oct. 10, 1989

[51] Int. Cl.$^5$ .......................................... E21B 47/04
[52] U.S. Cl. ........................................ 73/155; 73/302; 166/252; 340/618
[58] Field of Search ............ 73/301, 302, 155, 40.5 R; 166/252, 113; 340/618

[56] References Cited

U.S. PATENT DOCUMENTS

| | | | |
|---|---|---|---|
| 3,938,549 | 2/1976 | Nunneley | 116/70 X |
| 3,969,942 | 7/1976 | Hope et al. | 73/302 |
| 4,523,465 | 6/1985 | Fasching et al. | 73/290 |
| 4,570,718 | 2/1986 | Adams, Jr. | 166/369 |
| 4,747,451 | 5/1988 | Adams, Jr. et al. | 166/53 |

FOREIGN PATENT DOCUMENTS 100474 5/1916 United Kingdom .................. 73/302
353018 7/1931 United Kingdom .................. 73/302

OTHER PUBLICATIONS

Liptak, B. G. "Inst. Engr. Hdbook-Process Measurment" 1982 p. 199, Chilton Book Co.
Phillips Pet. Co., ltr. to EPA of Oct. 2, 1987, Attachment V, "Device for Accomplishing Fluid Level Monitoring".

Primary Examiner—Jerry W. Myracle
Attorney, Agent, or Firm—George E. Bogatie

[57] ABSTRACT

A method for detecting the presence of a liquid level at a monitor point along the depth of a borehole utilizes a diaphragm pressure switch for sensing the pressure of a captive air column in a measurement tube extending from the pressure switch to a predetermined point below the monitor point. In use a rising liquid level in the borehole seals an open lower end of the measurement tube from the earth atmosphere and allows the rising liquid level to compress the captive air column. In a preferred embodiment a visual signal is activated by the pressure switch when the liquid level in the borehole reaches the monitor point.

9 Claims, 2 Drawing Sheets

LIQUID LEVEL DETECTION

This invention relates generally to sensing the presence of a liquid level. In one aspect it relates to a liquid level detection method for use in an injection well having a borehole. In another aspect it relates to a method for determining whether or not a liquid level is present at a preselected depth in a borehole.

BACKGROUND OF THE INVENTION

In recent years the domestic oil industry has been placing greater and greater emphasis on the secondary (and tertiary) recovery of oil. This is so because (1) exploration costs have increased, (2) large domestic reserves are rarely found, and (3) crude oil imports are required to meet demands. These reasons coupled with ever more stringent environmental protection requirements have resulted in a continual domestic crude oil shortage.

Waterflood, the oldest assisted oil recovering method, remains the most commonly used method in the United States for increasing domestic supplies. In waterflood, water is introduced into an oil reservoir through an injection well. As used herein an injection well is a well utilized in secondary recovery of petroleum, in which a fluid such as gas or water is injected into an oil reservoir to provide supplemental energy to drive the oil remaining in the reservoir to the vicinity of production wells.

In the practical application of injection wells, a new well may be drilled or a producing well may be converted to an injection well. As injection well therefore includes the injection tubing string in addition to the packer, casing, and possibly a production casing. In operation of an injection well, it is generally impossible to make a statement as to the optimum injection rate for flooding a reservoir because of the wide range of rock and fluid characteristics in oil reservoirs. It is recognized, however, that excessive injection pressure, which can lead to uncontrolled reservoir fracturing, should be avoided. On the other hand the injection rate and the accompanying injection pressure must be sufficient to maintain production.

A problem that arises with injection wells is that sometimes the water level rises into the borehole and fills the space between the various tubes and the casing. In active wells a leak in the injection tubing or packing can fill the annulus between the injection tubing and the casing, and injection water will eventually seep into the formation surrounding any leak in the casing. Another possible scenario is that a leak in the injection tubing or packing, which allows injected water to back up into the annulus, would be accelerated by an excessive injection rate. Water levels can also rise in inactive wells due to leaks in the casings.

In the event of a leak in the casing, injection water can seep into the surrounding formation and contaminate underground sources of drinking water which are at depths below the leak in the casing. Consequently the U.S. Environmental Protection Agency has enforced mechanical integrity regulations for water injection wells. These regulations require non-leaking casings so as to safeguard the underground sources of drinking water.

Since casing leaks are expensive to repair and because injection wells having casing leaks are especially numerous in older oil fields, a method for determining the presence of water at a level in the borehole of an injection well which would not threaten underground sources of drinking water, and which would allow steps to be taken to prevent further rise of water in the borehole, would be desirable. The detection method would thereby safeguard underground sources of drinking water without making expensive repairs necessary.

Accordingly it is an object of this invention to provide a method for detecting the presence of a liquid level in a borehole which is reliable, inexpensive, and relatively simple to implement.

It is a further object of this invention to detect the presence of liquid in a borehole without employing electrical devices in the borehole.

It is still another object of this invention to protect underground sources of drinking water from contamination by injection water used in secondary oil recovery.

SUMMARY OF THE INVENTION

In accordance with the present invention a first predetermined point along the depth of a borehole is monitored for the presence of a liquid level. The method comprises the steps of:

(a) installing a measuring tube in the borehole, the measuring tube having an open upper end and an open lower end positioned in the borehole at a second predetermined point along the depth of the borehole wherein the second predetermined point is below the predetermined first point;

(b) sealing the open upper end of the measuring tube from externally applied pressures while the open lower end of the measuring tube is in communication with the earth's atmosphere;

(c) allowing a quantity of air in the measuring tube to be trapped when the liquid level rises and contacts the open lower end of the measuring tube so as to seal the open lower end of the measuring tube from the earth's atmosphere;

(d) allowing the trapped quantity of air to be compressed in proportion to elevation of the liquid level above the second predetermined point; and (e) establishing a signal, responsive to the actual pressure of the trapped quantity of air, the signal indicating the presence of the liquid level at the first predetermined point.

In a preferred embodiment of this invention a point in the borehole of a water injection well is monitored. The selected point is below the lowest level of any underground sources of drinking water in the surrounding area. Monitoring the selected point is therefore an effective method of safeguarding the underground sources of drinking water, since steps such as starting or shutting down a pump, or closing a valve can be taken before the injection water in the borehole rises to a level which actually threatens the underground sources of drinking water. Further in the preferred embodiment of the present invention a visual signal is displayed to alert operators of the injection wells before the liquid level reaches a threatening level.

DESCRIPTION OF THE PREFERRED EMBODIMENT

While the invention is described in terms of sensing a water level in an injection well utilized for secondary oil recovery it is not limited to sensing water. Any fluid level which rises in a borehole and which has a density sufficient to compress a column of air can utilize the method of the present invention.

Figure 1:
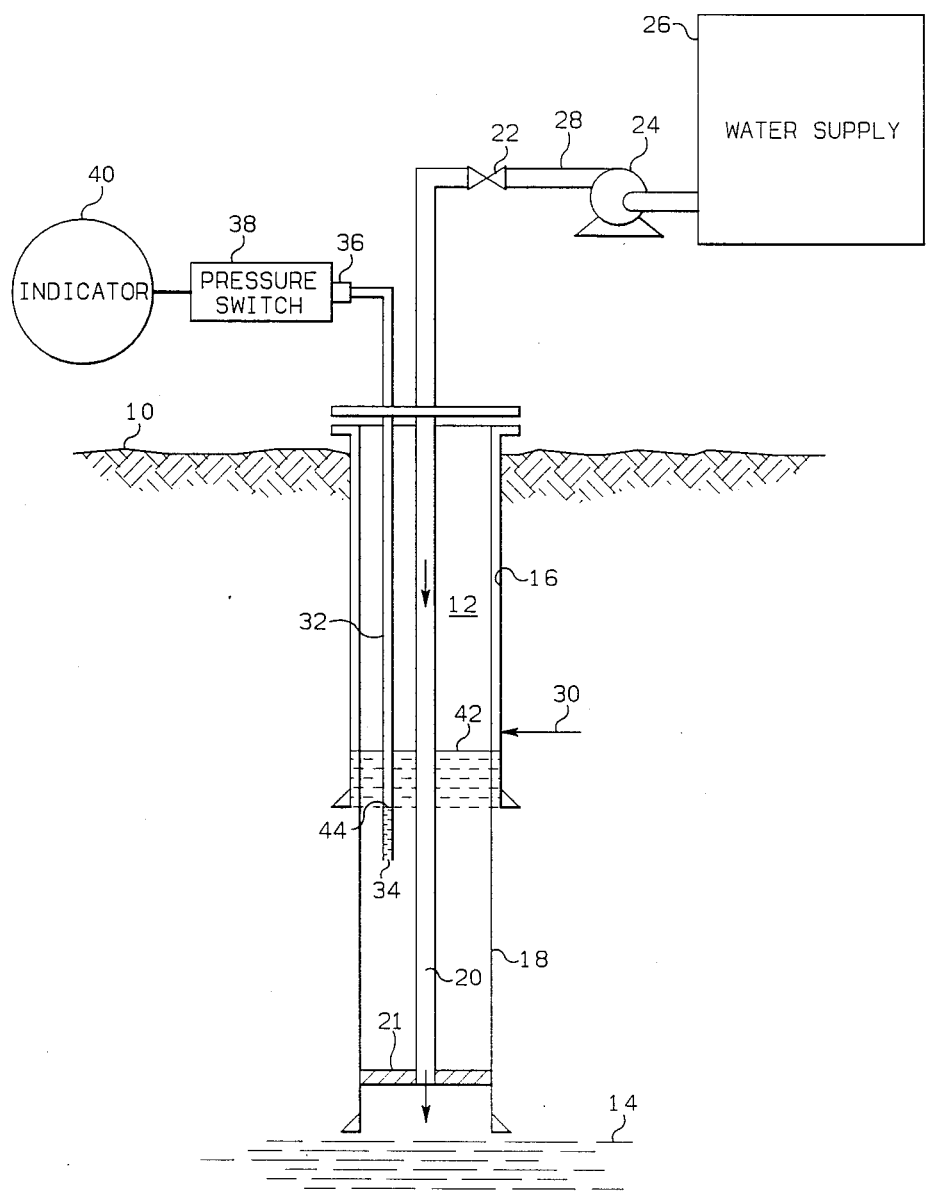
FIG. 1 is a schematic illustration of a water injection well with associated apparatus for utilizing the method of the present invention.

Referring to FIG. 1 there is illustrated a schematic view of an injection well which is equipped for sensing the presence of a liquid level at a preselected point along the depth of the borehole. The ground level 10 is indicated with a bore 12 extending downwardly therefrom until the producing formation 14 is encountered. As is typical, the bore is cased with steel casing 16 for maintaining the integrity of the bore. Hung from the surface within the steel casing 16 is a production tube string 18 and an injection tube string 20 with the packing 21 producing a seal between the tubular strings 18 and 20. In normal operation of an injection well when a fluid such as water is injected into an underground oil reservoir 14, valve 22 is at least partially open and pump 24 flows water from water supply 26 via conduit 28 and valve 22 into the injection tube string 20. The water supply 26 may be any suitable supply. Generally speaking the water supply for a water flood should be extensive, inexpensive, free from bacteria, suspended solids and oxygen and unreactive to any clays in the reservoir itself.

In any waterflood of an oil reservoir the possibility exists for a water level to rise into the bore 12 through leaks in the injection tubing 20 or packing 21, and the rising water level in the borehole 12 will be accelerated if excess injection water is pumped. Further illustrated in FIG. 1, by the arrow 30, is the lowest level of any underground source of drinking water which must be protected.

In accordance with the invention as illustrated in FIG. 1 a measuring tube 32 is installed in the bore 12 by any suitable means such as rigidly hanging from the surface. An open end 34 of the measuring tube 32 is positioned at a point below the drinking water level 30 as will be more fully explained hereinafter. The measurement inlet port of a pressure switch 38 is attached to the upper end 36 of the measuring tube 32 while the lower end 34 is in open communication with the earth's atmospheric pressure. The pressure switch 38 seals off the upper end 36 of the measuring tube 32 from externally applied pressures. The measuring tube 32 may be of any convenient diameter such as, for example, a ⅜ inch tube. Generally copper or stainless steel tubes can be suitably employed for the measuring tube 32.

Figure 2:
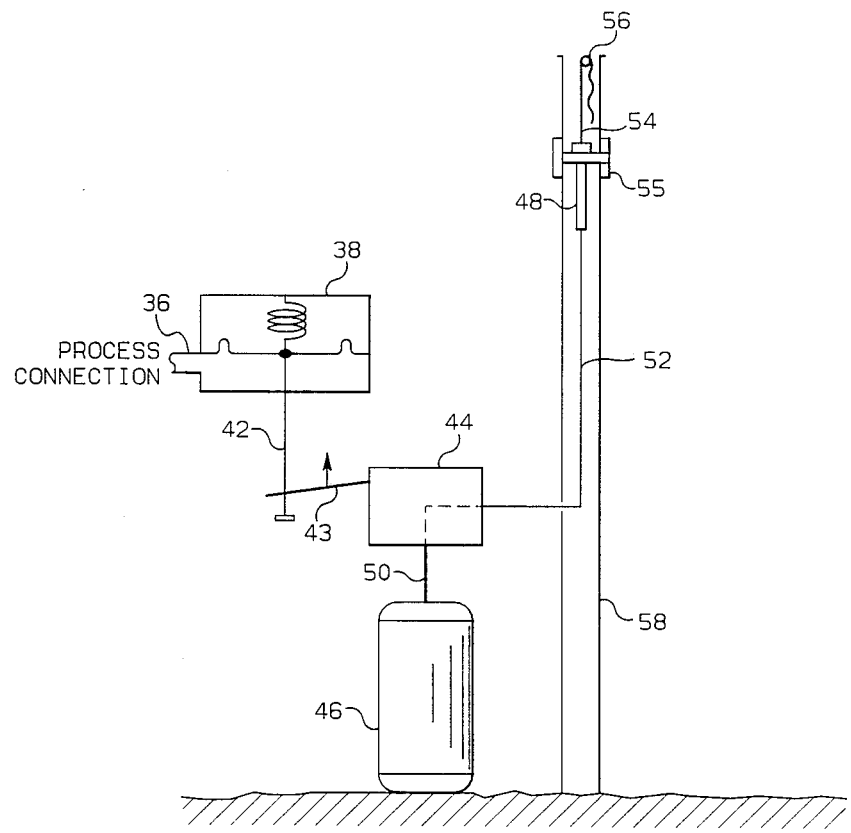
FIG. 2 is a schematic illustration of a pneumatically actuated indicating device according to the invention.

Assuming that the water level 42 in the bore 12 is initially well below the open end 34 the measuring tube 32, but that the water level 42 rising in the bore 12 traps a quantity of air in the tube 32. Then further elevation of fluid level 42 will compress the trapped air captured in measuring tube 32 in proportion to the elevation of the fluid level 42 above the lower end 34 of the tube 32. When the rising pressure in tube 32 reaches the predetermined pressure level that will activate the pressure switch 38, a suitable signal, preferably a visual signal, is activated. The visual signal may be an electric light; however, in a preferred embodiment the visual indicator is a flag 56 that is elevated above surrounding structure by, for example, activating an air piston 48, as shown in FIG. 2. The pneumatically actuated flag signal is particularly attractive for unattended wells in that the flag may easily be observed in daylight while driving by an oil field in a car and further in that no external energy is used until the signal is activated.

The pressure switch 38 may be any suitable switch. The essential requirements being that the switch 38 operate at a low pressure level such as, for example, 2 or 3 psig and that the diaphragm volume of the switch 38 be negligible compared to the volume of the measuring tube 32. In the preferred embodiment the switch 38 is one that depends on the deflection of a diaphragm, referenced to atmospheric pressure, to change its length and transmit this motion to an output shaft such that a predetermined or set point pressure corresponds to a predetermined movement of the output shaft. Switch 38 may also be a switch used to energize and deenergize electrical circuits as a function of the process pressure and a predetermined set point. Operation of the different switches is illustrated in FIG. 2 and FIG. 3.

Referring now to FIG. 2, where like reference numerals refer to the same part in each of the drawing figures in which the part appears, there is schematically illustrated a deflection type pressure switch in accordance with the invention. The pressure switch 38 illustrated in FIG. 2 transmits motion to an output shaft 42 which in turn activates a lever action micro valve 44 by moving the lever 43. The micro valve 44 connects an air supply 46 to an air operated cylinder 48 via conduits 50 and 52. The air pressure supplied to the cylinder 48 pushes the rod 54 upwardly thereby displaying a signal flag 56 which is attached to rod 54. Air operated cylinder 48 is supported near the upper end of support pipe 58 by a fitting sandwiched between pipe ends at coupler 55. The vertically positioned pipe 58 positions the cylinder 48 in an elevated position so that the flag signal is visible from a distance when air cylinder 48 operates and pushes the flag 56 out of the end of the pipe 58.

Figure 3:
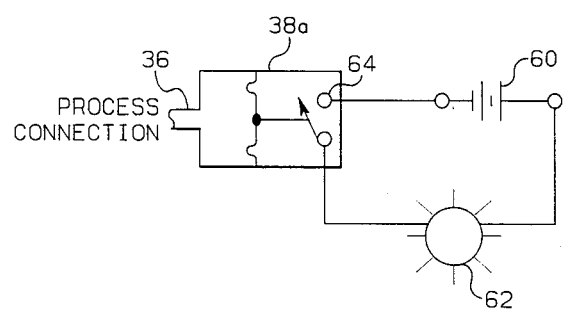
FIG. 3 is a schematic illustration of an electrically actuated indicating device according to the invention.

Referring now to FIG. 3 there is illustrated a pressure switch 38a of the type for activating or deactivating an electrical device and where the pressure switch 38a operates with reference to a predetermined set point. In operation, switch 38a changes from an "ON" position to an "OFF" position depending on the actual value of the process pressure. As illustrated in FIG. 3, a voltage source such as a battery 60 and an indicating lamp 62 are connected in series with the pressure switch terminal 64. With this arrangement the lamp is illuminated when the process pressure reaches the monitored level. The invention, however, contemplates operation of other electrical devices connected to the pressure switch terminal 64, for example, an electric motor for the pump 24 could be turned "ON" or "OFF" by the pressure switch 38.

To further illustrate the invention, Table 1, set forth below, is a calculated example of the depth of a monitored point in a well bore and the corresponding base of the deepest underground source of drinking water to be protected. Also shown in Table 1 is the length of a measuring tube required to operate pressure switches having a set point of 2 psig and 3 psig. This Table 1, which is based on calculations using the ideal gas law, is constructed to satisfy the particular requirements of a regulating agency. In Table 1 the depth of the open lower end 34 of the measuring tube 32 is about 14% below the monitor point when using a 2 psi pressure switch and is about 21% below the monitor point when using a 3 psi pressure switch.

TABLE 1

| ILLUSTRATIVE DEPTH REQUIREMENTS | | | |
|---|---|---|---|
| BASE OF PROTECTED SOURCE | MONITOR POINT | MEAS. TUBE 3 psi Switch | MEAS. TUBE 2 psi Switch |
| 100 | 200 | 242 | 228 |
| 200 | 300 | 362 | 342 |
| 300 | 400 | 483 | 455 |
| 400 | 500 | 604 | 569 |
| 500 | 600 | 725 | 683 |
| 600 | 700 | 846 | 797 |
| 700 | 800 | 967 | 911 |
| 800 | 900 | 1088 | 1025 |

All depths are given in feet.

In summary the method of the present invention provides means for insuring that a visual or other suitable warning signal is displayed if the water level in the borehole of an injector well approaches a level that could threaten an underground source of drinking water, so as to allow time for remedial action before the underground source of drinking water is actually threatened.

The invention has been described in terms of a presently preferred embodiment as illustrated in FIGS. 1–3. Specific components which can be used in the practice of the invention as illustrated in FIG. 1, such as pressure switch 38, a lever action micro valve 44 and air cylinder 48, having a sufficient stroke length, are each well known, commercially available components such as are described at length in Perry's Chemical Engineers Handbook, 5th Addition Chapter 22 McGraw-Hill, and are commercially available from suppliers such as McMaster-Carr, Chicago, Ill.

While the invention has been described in terms of the presently preferred embodiment, reasonable modifications and variations are possible by those skilled in the art and such modifications and variations are within the scope of the described invention and the appended claims.

That which is claimed is:

1. A method for detecting presence of a liquid level at a first predetermined point along the depth of a borehole, said method comprising the steps of:
    (a) installing a measuring tube in said borehole, wherein the lower end of said measuring tube is positioned in said borehole at a second predetermined point along the depth of said borehole, and wherein said second point is below said first point;
    (b) sealing off the upper end of said measuring tube from the earths atmosphere while said measuring tube is in communication with the earth's atmosphere through the lower end;
    (c) allowing a quantity of air in said measuring tube to be trapped when said liquid level in said borehole contacts the lower end of said measuring tube so as to seal off the lower end of said measuring tube from the earth's atmosphere;
    (d) allowing said trapped quantity of air to be compressed in proportion to elevation of said liquid level above said second predetermined point; and
    (e) establishing a signal, responsive to the actual pressure of said trapped quantity of air, said signal indicating presence of said liquid level at said first predetermined point.

2. A method in accordance with claim 1 wherein said step (b) comprises:
    connecting the upper end of said measuring tube to a measurement inlet port of a pressure switch, said pressure switch being in an "ON" position when a predetermined pressure appears at said measurement inlet port.

3. A method in accordance with claim 2 wherein said pressure switch depends on deflection of a diaphragm to transmit motion to an output shaft and wherein said step (e) comprises:
    raising a flag attached to a shaft on an air cylinder by pneumatically operating said air cylinder when said pressure switch is in its "ON" position.

4. A method in accordance with claim 2 wherein said pressure switch energizes and deenergizes electrical circuits as a function of the process pressure and a set point, and wherein said step (a) comprises:
    electrically connecting a battery and an indicating light to a pair of switch output terminals of said pressure switch, so that said indicating light is illuminated when said pressure switch is in an "ON" position.

5. A method in accordance with claim 4 wherein said pressure switch operates in a range of from about 2 psig to about 3 psig.

6. A method in accordance with claim 2 wherein said second predetermined point is from about 14% to from about 20% deeper than said first predetermined point.

7. A method in accordance with claim 1 wherein said borehole is utilized for water flooding of an underground oil reservoir, and wherein said first predetermined point lies below the lowest level of a drinking water deposit in the drainage area surrounding said borehole.

8. A method in accordance with claim 1, wherein said second predetermined point is representative of the length of said measuring tube required to operate a pressure switch at a preset pressure corresponding to the pressure of said trapped quantity of air when said liquid level rises in said borehole to a level corresponding to said first predetermined point.

9. A method for protecting underground sources of drinking water from contamination caused by injection water used in secondary oil recovery, by detecting the presence of a liquid level at a monitor point along the depth of a borehole, said monitor point being representative of the lowest level of drinking water deposited in the drainage area surrounding said borehole, said method comprising the following steps:
    (a) installing a measuring tube in said borehole, wherein said measuring tube is in communication with the earth's atmosphere;
    (b) connecting the upper end of said measuring tube to the measurement inlet port of a pressure switch while the lower end is open to the earth's atmosphere;
    (c) allowing a quantity of air in said measuring tube to be trapped when said liquid level rises in said borehole and contacts the lower end of said measuring tube so as to seal off the lower end of said measuring tube from the earth's atmosphere;
    (d) allowing said trapped quantity of air to be compressed in proportion to elevation of said liquid level above the lower end of said measuring tube;
    (e) wherein the lower end of said measuring tube is positioned at a depth point in said borehole representative of the length of said measuring tube required to operate said pressure switch at a preset pressure, and wherein said preset pressure corresponds to the actual pressure of said trapped quantity of air when said liquid level rises in said borehole to a level corresponding to said monitor point;
(f) establishing a warning signal, responsive to the actual pressure of said trapped quantity of air, said warning signal indicating presence of said liquid level at said monitor point; and
(g) raising a flag attached to a shaft on an air cylinder by pneumatically operating said air cylinder responsive to said warning signal.

* * * * *